United States Patent [19]

Cain

[11] 4,320,665
[45] Mar. 23, 1982

[54] METHOD AND MEANS FOR MEASURING FLOW OF A TWO PHASE FLUID

[75] Inventor: David G. Cain, Los Altos, Calif.

[73] Assignee: Electric Power Research Institute, Inc., Palo Alto, Calif.

[21] Appl. No.: 104,121

[22] Filed: Dec. 17, 1979

[51] Int. Cl.³ .......................... G01F 1/46; G01F 1/74
[52] U.S. Cl. ............................... 73/861.04; 73/861.65
[58] Field of Search ............... 73/198, 861.04, 19, 73/61 R, 861.65

[56] References Cited

U.S. PATENT DOCUMENTS

| | | | |
|---|---|---|---|
| 3,075,383 | 1/1963 | Favill et al. | 73/861.04 |
| 3,934,471 | 1/1976 | White et al. | 73/861.04 |
| 4,010,643 | 3/1977 | Dekan | 73/198 |
| 4,010,645 | 3/1977 | Herzl | 73/861.04 |

Primary Examiner—Herbert Goldstein
Attorney, Agent, or Firm—Flehr, Hohbach, Test et al.

[57] ABSTRACT

A Pitot tube is provided for measuring fluid momentum in a transmission line. A signal is transmitted through the Pitot tube to the fluid, and return energy is detected to determine the gas or liquid phase of the fluid at the point of momentum measurement, thus providing a more accurate measurement of fluid flow. Two Pitot tubes may be employed to determine absolute pressure or momentum and static pressure, from which the dynamic pressure is determined. The transmitted signal may be ultrasonic, electrical, or optical.

9 Claims, 7 Drawing Figures

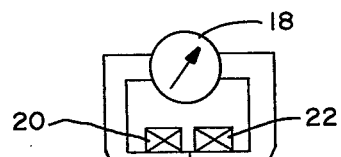
FIG.—1
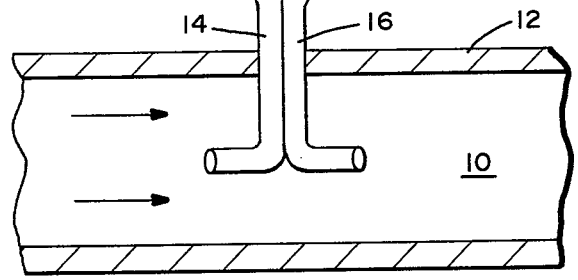
FIG.—2A
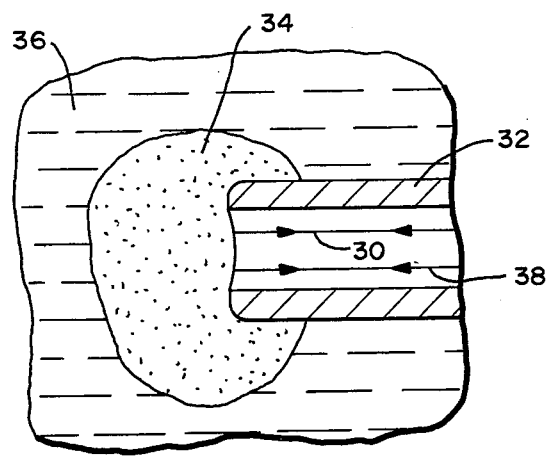
FIG.—2B

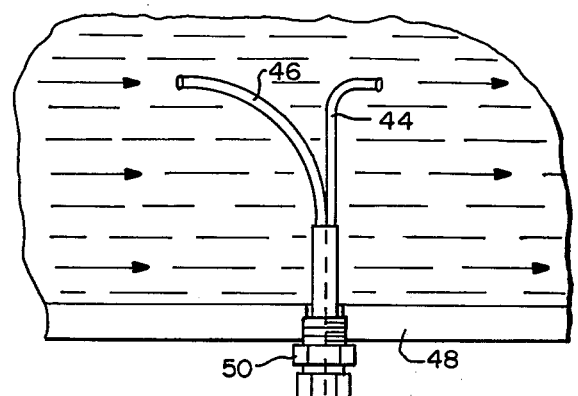
FIG.—3
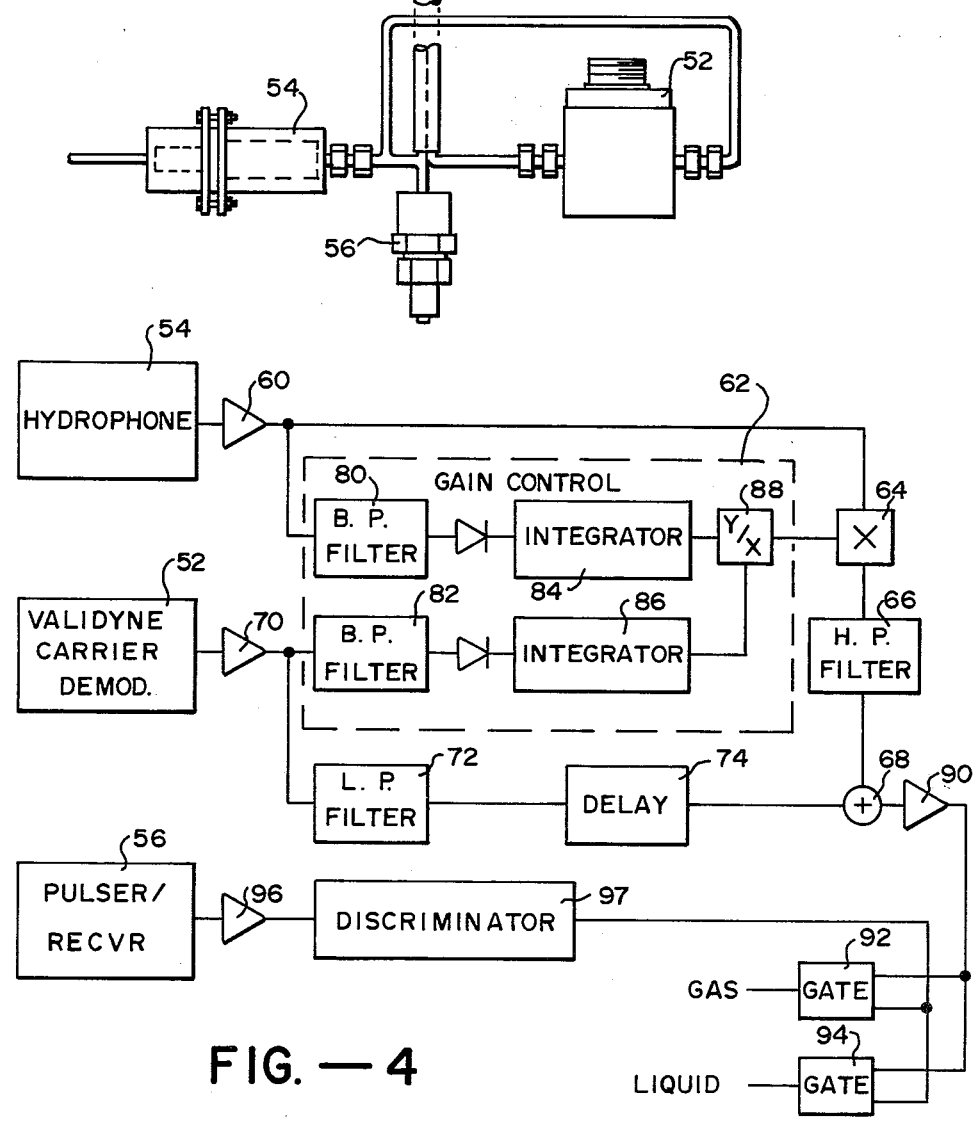
FIG.—4

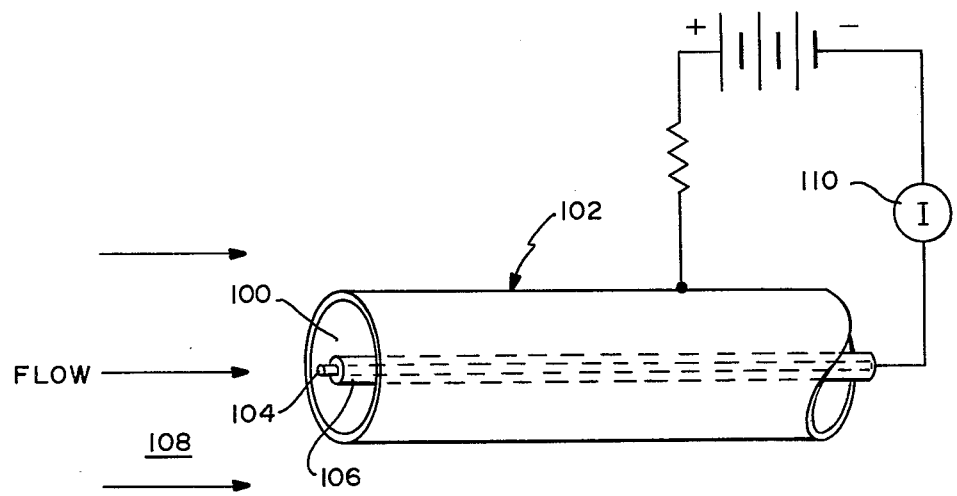
FIG.—5
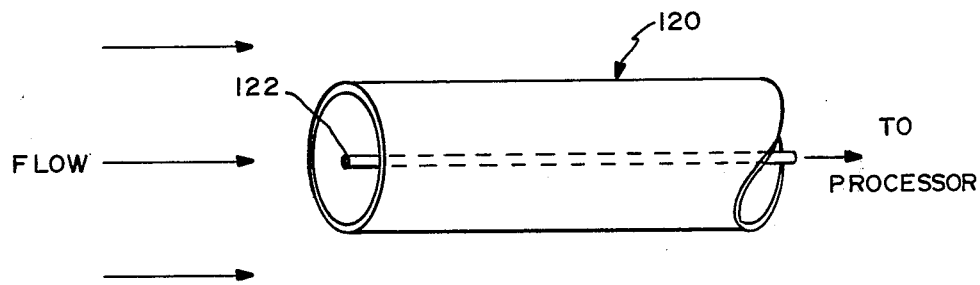
FIG.—6

METHOD AND MEANS FOR MEASURING FLOW OF A TWO PHASE FLUID

This invention relates generally to apparatus for measuring fluid flow in a transmission line, and more particularly the invention relates to apparatus for measuring flow of a two phase fluid.

The measurement of fluid flow is required in many applications for process control and safety monitoring. The Pitot tube is a commonly employed instrument for measuring fluid flow. The Pitot tube is generally L-shaped and is inserted into the flowing fluid with its open end facing upstream for measuring absolute fluid pressure or with its open end facing downstream for measuring static pressure. Accordingly, the dynamic pressure (momentum) of the fluid can be determined by subtracting the static fluid pressure from the absolute fluid pressure, and from the dynamic pressure and known fluid density the velocity of the fluid can be determined.

While the Pitot tube is accurate in a single phase fluid (e.g. either gas or liquid), in a two phase flow accuracy is limited because neither density nor velocity of the fluid remains constant. Variations in one parameter are difficult to distinguish from variations in the other parameter. Another instrument can be employed along with the Pitot tube to measure density or velocity of the fluid; however, parameter variations at the second instrument may not be the same as those changes seen by the Pitot tube.

Often, the readings of the Pitot tube in a two phase fluid are interpreted as a mixture average. However, this interpretation ignores the fact that each phase may have a different momentum value and the assumption of a mixture average results in a loss of information. It follows that extraction of an averaged fluid velocity or individual velocities is not tractable.

Accordingly, an object of the present invention is an improved method and means for measuring flow of a two phase fluid.

A feature of the invention is the use of phase sensing means in the pressure sensing mechanism to determine the phase of a fluid at the point of pressure measurement.

Briefly, in accordance with the present invention the flow of a two phase fluid in a transmission line is determined by measuring the static fluid pressure within the line, measuring the absolute fluid pressure within the line, determining the dynamic fluid pressure of the fluid from the measured static and absolute fluid pressures. In a preferred embodiment, ultrasonic energy is applied to the fluid and reflected ultrasonic energy is detected. The measurement of the reflected ultrasonic energy is indicative of the liquid-gas mixture of the fluid. Alternatively, other compatible phase detection schemes may be introduced at the point of absolute pressure measurement such as use of optical sensors or electrical conductance sensors.

In carrying out the invention apparatus for measuring flow of the two phase fluid in the transmission line includes a first transducer means for measuring dynamic pressure within the transmission line, second transducer means for measuring static pressure within the transmission line, and a signal generator and receiver. A suitable signal is transmitted to the fluid at the point of dynamic pressure measurement and the resulting effect of the fluid on the signal is detected.

Preferably, the first transducer means is connected with a first Pitot tube and the second transducer means is connected with a second Pitot tube. A second transmission line for transmitting the signals to the fluid may advantageously comprise the first Pitot tube. Thus, the phase of the fluid at the exact point of absolute pressure measurement is established.

The invention and objects and features thereof will be more fully understood from the following detailed description and appended claims when taken with the drawing.

In the drawing, FIG. 1 is a simplified block diagram of apparatus for measuring flow of a two phase fluid in accordance with one embodiment of the present invention.

FIGS. 2A and 2B are cross section views of the ends of a Pitot tube which illustrate the effects of fluid phase on transmitted ultrasonic energy.

FIG. 3 is a more detailed diagram of one embodiment of apparatus for measuring two phase fluid flow in accordance with the invention.

FIG. 4 is a functional block diagram of signal processing means for determining fluid velocity utilizing apparatus in accordance with the present invention.

FIG. 5 is a perspective view of a portion of another embodiment of the invention.

FIG. 6 is a perspective view of a portion of another embodiment of the invention.

Referring now to the drawings, FIG. 1 is a simplified block diagram of apparatus for measuring flow of a two phase fluid 10 within a tubular transmission line 12. The apparatus includes a first Pitot tube 14 having an open end facing opposite the flow of the fluid 10, and a second Pitot tube 16 having an open end facing in the direction of fluid flow. Pitot tube 14, facing upstream, measures absolute pressure of the fluid in tube 12, and Pitot tube 16, facing in the direction of fluid flow, measures static pressure. A differential pressure transducer 18 is provided for determining dynamic pressure of the fluid by subtracting the static pressure from Pitot tube 15 from the absolute pressure of Pitot tube 14.

As above indicated, such an arrangement of Pitot tubes provides an accurate measure of fluid velocity with either a liquid or gas fluid flow. However, when both phases may be present, the measured fluid momentum may vary due to either changes in density of the fluid or in velocity of the fluid. Accordingly, heretofore readings of Pitot tubes have been interpreted as an average fluid mixuture which ignores the fact that each phase of the fluid may have a different momentum value.

In accordance with the invention one or more ultrasonic transducers 20 and 22 are provided to determine the instantaneous phase at the opening of the Pitot tube at the time of measurement of fluid momentum. By applying an ultrasonic signal to the fluid and detecting any reflective wave, the phase of the fluid can be determined, and the fluid momentum and hence fluid velocity can be more accurately determined.

FIGS. 2A and 2B illustrate graphically the effect of an ultrasonic wave applied through a probe to a fluid. The tube is filled with the fluid in the liquid phase and the ultrasonic wave is transmitted through the tube to the flowing fluid. In FIG. 2A the ultrasonic wave 30 is transmitted through liquid within probe 32 and encounters a gas bubble 34 within the fluid 36. The presence of the liquid-gaseous interface at the tip of probe 32 results in a reflection of ultrasonic energy 38.

However, in FIG. 2B the tip of probe 32 contacts liquid fluid 36, and the transmitted ultrasonic wave 30 continues into the fluid 36 as shown by waves 40 with no ultrasonic energy being reflected back through the probe 32. In actuality some ultrasonic energy is reflected back on account of the geometric discontinuity at the tube tip. This wave is, however, easily discriminated from the more energetic wave reflected from the liquid/gas interface.

Thus, by applying ultrasonic energy through a transmission line such as a probe to the fluid within the first transmission line and detecting the presence of reflected ultrasonic energy, the instantaneous state of the fluid at the tip of the transmission line or probe can be determined. Accordingly, the fluid momentum is more accurately determined.

FIG. 3 is a more detailed drawing of one specific embodiment of flow measuring apparatus in accordance with the invention. In this embodiment a first Pitot tube 44 having a relatively sharp L bend is provided with the open end of the tube facing in the direction of current flow for measuring static pressure, and a second Pitot tube 46 having a relatively large arcuate bend has an open end facing opposite the flow of fluid. The large bend is to facilitate ultrasonic wave propagation outwards from the transmission line wall, against the direction of flow. The two Pitot tubes are connected in the wall 48 of a transmission line by suitable conductor 50, and the static pressure Pitot tube 44 is connected to low frequency responsive differential pressure sensor 52 such as the Validyne DP 15TL transducer. This transducer has a frequency response which extends from direct pressure to 1,000 hertz. The absolute pressure Pitot tube 46 is connected to a fast responding pressure transducer 54 such as a Bruel and Kjaer Model 8103 hydrophone. This transducer has a flat response characteristic from 0.1 hertz to 70 kilohertz which is suitable for monitoring dynamic pressure fluctuations.

Also connected to Pitot tube 46 is an ultrasonic wave transmitter/receiver 56 such as a Panametrics Model 5055 pulser-receiver. The Panametrics pulser-receiver applies a gated 5 megahertz ultrasonic wave through Pitot tube 46 to the flow of fluid and detects any reflected ultrasonic energy on a periodic basis. A similar pulser-receiver can be connected to Pitot tube 44, although not essential unless flow reversal becomes a factor.

FIG. 4 is a functional block diagram of a system utilizing the apparatus of FIG. 3. In the system of FIG. 4 the signals from transducers 52 and 54 are added to produce the measured dynamic pressure. Since a Validyne differential pressure transducer automatically eliminates the static pressure component and since the Bruel and Kjaer hydrophone is not responsive to static pressure, the sum of both signals represents the actual dynamic pressure signal. However, the gain and phase shift of the two signals must be consistent to assure an accurate measurement by adding the signals. Further, the signal from the hydrophone 54 must be passed through a high pass filter while the signal from the Validyne transducer 52 is passed through a low pass filter whereby the information content of the two signals do not have an overlapping frequency range.

In the system of FIG. 4 the output of hydrophone 54 is passed through an amplifier 60 with the output of amplifier 60 applied to a gain control circuit shown generally at 62 and also to an attenuator 64. The output of attenuator 64 is passed to high pass filter 66 which removes frequencies below 1,000 hertz. The output of filter 66 is applied to summer 68.

The output from the Validyne transducer 52 is passed to an amplifier 70 with the output of amplifier 70 applied to the gain control circuit 62 and also through a low pass filter 72 and a delay line 74 to the summing network 68. Filter 72 removes frequencies above 1,000 hertz. Since the hydrophone 54 and the transducer 52 have an overlapping frequency region from 0.1 hertz to 1 kilohertz, band pass filters 80 and 82 receive the outputs from amplifiers 60 and 70, respectively, and transmit a frequency band between 0.1 hertz and 1,000 hertz to integrators 84 and 86, respectively. The outputs from integrators 84 and 86 are compared by comparator 88 and the output of comparator 88 controls attenuator 64. Thus, the output of attenuator 64 will be consistent in gain with the output of amplifier 70.

High pass filter 66 passes frequencies above 1,000 hertz from the hydrophone 54 as adjusted by attenuator 64, and low pass filter 72 passes frequencies below 1,000 hertz from the Validyne transducer 52. Delay circuit 74 is provided to compensate for delay introduced in the signal from hydrophone 54 due to the attenuator 64. Thus, the output from summing network 68 is a signal having frequency components from 0.1 hertz to 1,000 hertz from the Validyne transducer and from 1,000 hertz to 70 kilohertz from hydrophone 54. The summed signal is then applied to an amplifier 90 and the output of amplifier 90 is applied to inputs of gates 92 and 94.

Control of the gates 92 and 94 is in response to the ultrasonic transmitter/receiver 56 which responds to the presence of a reflected wave to transmit a signal through amplifier 96 and discriminator 97 to open gate 92 thereby indicating that the pressure signal from amplifier 90 is for a gaseous fluid. Alternatively, if no reflected wave is received by the transmitter/receiver 56, a signal is transmitted to amplifier 96 and discriminator 97 which enables gate 94, and the signal from amplifier 90 indicates a liquid pressure reading.

FIGS. 5 and 6 are perspective views of portion of other illustrative embodiments of the invention in which the phase detectors respond to electrical conduction and light reflection, respectively, of the fluid rather than to ultrasonic wave reflections. In FIG. 5 a single insulated conductor concentric cable 100 is placed within Pitot tube 102 with the conductor 104 exposed to the fluid 103. The Pitot tube serves as a second electrode. Assuming that the fluid is conductive in the liquid state and non-conductive (or highly resistive) in the gaseous state, the magnitude of current flow, as measured by ammeter 110, will indicate the state of the fluid.

In FIG. 6, the Pitot tube 120 functions as an optical wave guide with a fiber optic 122 placed within tube 120. Light is continuously transmitted down the fiber optic 122; cut at the Brewster angle at the tip the magnitude of light reflected through light guide tube 120 is measured in a manner similar to the application of ultrasonic waves, after separation from the incident wave by means of a beam splitter.

Thus, instantaneous and accurate velocity measurements can be determined by detecting not ony the dynamic pressure of the fluid flow but also the phase of the fluid at the time of pressure measurement. Since the system can differentiate between liquid and vapor at the Pitot tube tips, the time increments for the vapor phase can be measured and summed to give the average void fraction, that is, $$\overline{a} = \frac{1}{T} \sum_{i}^{N} t_i,$$

where $a$, $t_i$ and $T$, are the average void fraction, time increments, and total number of increments used in summation, and elapsed time of measurement, respectively.

The average void fraction can be related to the mean density of the mixture using the standard relationship:

$$\rho = a\, \rho_g + (1-a)\rho_f$$

where $\rho_g$ and $\rho_f$ are the vapor and liquid densities, respectively; thermal equilibrium being assumed.

Because density as well as momentum is measured, it is now possible to make a distinction between density and velocity. For example, the mass flux or mass velocity can be computed using the following formula:

$$\overline{G} = \overline{C}\left[ \left(\frac{1}{T}\sum_{i=1}^{N} t_i\right) \int_{o}^{T} \Delta P(t)dt \right]^{\frac{1}{2}}$$

where $\Delta P(t)$ is the differential pressure reading as a function of time.

$\overline{C}$ is a calibration constant ($\overline{C} \approx 0.74$)

Alternatively, by gating the differential pressure reading according to whether the probe is immersed in vapor or liquid, the differential pressure readings will therefore correspond to $$\Delta P_f = C_l \rho_f V_f^2$$

$$\Delta P_g = C_g \rho_g V_g^2$$

depending on whether the liquid or vapor phase is present. $C_l$ and $C_g$ are single phase calibration constants. Assuming thermal equilibrium and given the pressure and calibration constants $C_l$ and $C_g$, it is possible to determine the individual phase velocities.

Finally, through gating, a more accurate determination of average mass velocity is obtained:

$$G = (\overline{a})\rho_g V_g + (1-\overline{a})\rho_f V_f.$$

While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. The method of measuring flow of a two phase fluid in a transmission line comprising the steps of:
    determining dynamic fluid pressure within said transmission line by measuring static fluid pressure within said line with a first Pitot tube, measuring absolute fluid pressure within said line with a second Pitot tube, and determining dynamic fluid pressure of said fluid from said measured static and absolute fluid pressures,
    applying a signal through said second Pitot tube to said fluid,
    detecting any return signal in said second Pitot tube,
    determining the phase of said fluid from said return signal, and
    determining fluid flow from said dynamic fluid pressure and said fluid phase.

2. The method as defined by claim 1 wherein said signal is an ultrasonic wave.

3. The method as defined by claim 1 wherein said signal is an electrical voltage.

4. The method as defined by claim 1 wherein said signal is an optical wave.

5. Apparatus for measuring flow of a two phase fluid in a transmission line comprising a first Pitot tube and a second Pitot tube for measuring dynamic pressure within said line, means for transmitting a signal through said first Pitot tube to said fluid and for receiving any return signal to thereby establish the liquid and gas state of said fluid, and means for determining fluid flow from said measured dynamic pressure and from said fluid state.

6. Apparatus as defined by claim 5 wherein said first Pitot tube has an open end facing in the direction of fluid flow and said second Pitot tube has an open end facing in the direction opposite to fluid flow.

7. Apparatus as defined by claim 5 wherein said means for transmitting a signal comprises an ultrasonic wave generator.

8. Apparatus as defined by claim 5 wherein said means for transmitting a signal comprises an electrical voltage source.

9. Apparatus as defined by claim 5 wherein said means for transmitting a signal comprises an optical wave source.

* * * * *